(12) United States Patent
Burke

(10) Patent No.: US 8,381,906 B2
(45) Date of Patent: Feb. 26, 2013

(54) BULK WIRE DAMPENING APPARATUS AND METHOD

(75) Inventor: Mark Burke, Etobicoke (CA)

(73) Assignee: Linclon Global, Inc., City of Industry, CA (US)

( * ) Notice: Subject to any disclaimer, the term of this patent is extended or adjusted under 35 U.S.C. 154(b) by 0 days.

(21) Appl. No.: 13/113,274

(22) Filed: May 23, 2011

(65) Prior Publication Data

US 2012/0298540 A1 Nov. 29, 2012

(51) Int. Cl.
*B65H 18/28* (2006.01)
(52) U.S. Cl. .......................... 206/408; 206/409
(58) Field of Classification Search .................. 206/408, 206/409, 397; 242/170, 171, 128, 129, 423, 242/423.1
See application file for complete search history.

(56) References Cited

U.S. PATENT DOCUMENTS

| | | | |
|---|---|---|---|
| 1,664,149 A * | 3/1928 | Almquest et al. ............. | 242/128 |
| 3,202,372 A * | 8/1965 | Meline et al. ................ | 242/386 |
| 3,461,659 A * | 8/1969 | Greason ........................... | 57/62 |
| 3,982,712 A | 9/1976 | Bassett | |
| 4,111,380 A * | 9/1978 | Heuckroth .................... | 242/128 |
| 4,412,662 A * | 11/1983 | Rutecki ....................... | 242/125.3 |
| 4,869,367 A * | 9/1989 | Kawasaki et al. ............. | 206/409 |
| 5,105,943 A * | 4/1992 | Lesko et al. .................. | 206/397 |
| 5,669,246 A * | 9/1997 | Massardi ......................... | 66/146 |
| 5,819,934 A * | 10/1998 | Cooper ......................... | 206/397 |
| 6,367,725 B1 * | 4/2002 | Goodwin ..................... | 242/129 |
| 6,715,608 B1 * | 4/2004 | Moore .......................... | 206/397 |
| 6,857,521 B2 * | 2/2005 | Cantu-Gonzalez ........... | 206/397 |
| 6,913,145 B2 * | 7/2005 | Barton et al. ................ | 206/409 |
| 6,938,767 B2 | 9/2005 | Gelmetti | |
| 7,377,388 B2 | 5/2008 | Hsu et al. | |
| 7,866,586 B2 | 1/2011 | Fabian | |
| 7,891,602 B2 | 2/2011 | Hatcher et al. | |
| 7,950,523 B2 * | 5/2011 | Gelmetti ....................... | 206/408 |
| 2004/0206652 A1 * | 10/2004 | Barton et al. ................ | 206/397 |
| 2005/0194278 A1 * | 9/2005 | Barton et al. ................ | 206/409 |
| 2008/0142626 A1 * | 6/2008 | Park ........................... | 242/160.4 |
| 2008/0142627 A1 * | 6/2008 | Lee ............................ | 242/160.4 |
| 2009/0107867 A1 * | 4/2009 | Bang et al. .................... | 206/408 |
| 2010/0012540 A1 | 1/2010 | Gelmetti | |

FOREIGN PATENT DOCUMENTS

| | | |
|---|---|---|
| EP | 1357059 A2 | 10/2003 |
| EP | 1295813 B1 | 12/2009 |
| EP | 2256064 A1 | 12/2010 |
| JP | 1995178538 A | 7/1993 |
| JP | 7304570 A | 11/1995 |
| JP | 8040642 A | 2/1996 |

* cited by examiner

*Primary Examiner* — Steven A. Reynolds
*Assistant Examiner* — King M Chu
(74) *Attorney, Agent, or Firm* — Hahn Loeser & Parks LLP

(57) ABSTRACT

A bulk wire dampening apparatus has a rod, an optional bracket, and a damper assembly. The damper assembly includes a sleeve and a damper where the sleeve slideably engages the rod.

17 Claims, 5 Drawing Sheets

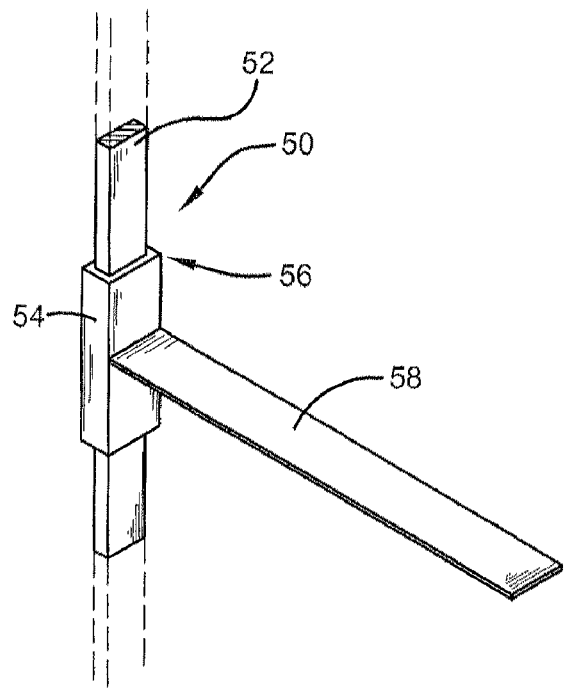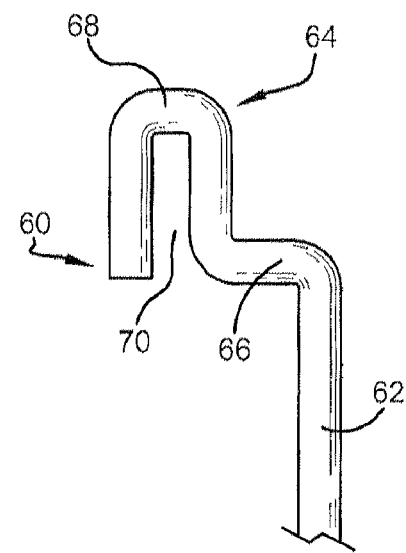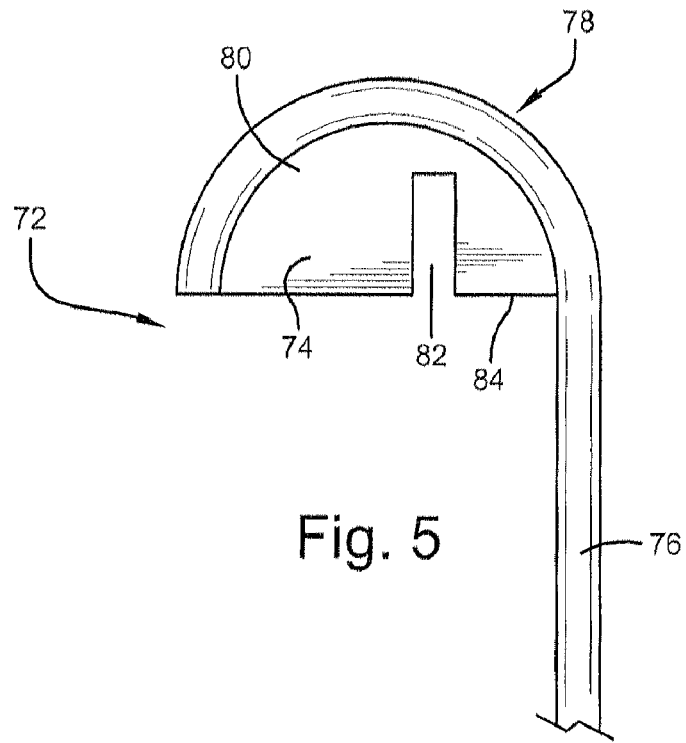

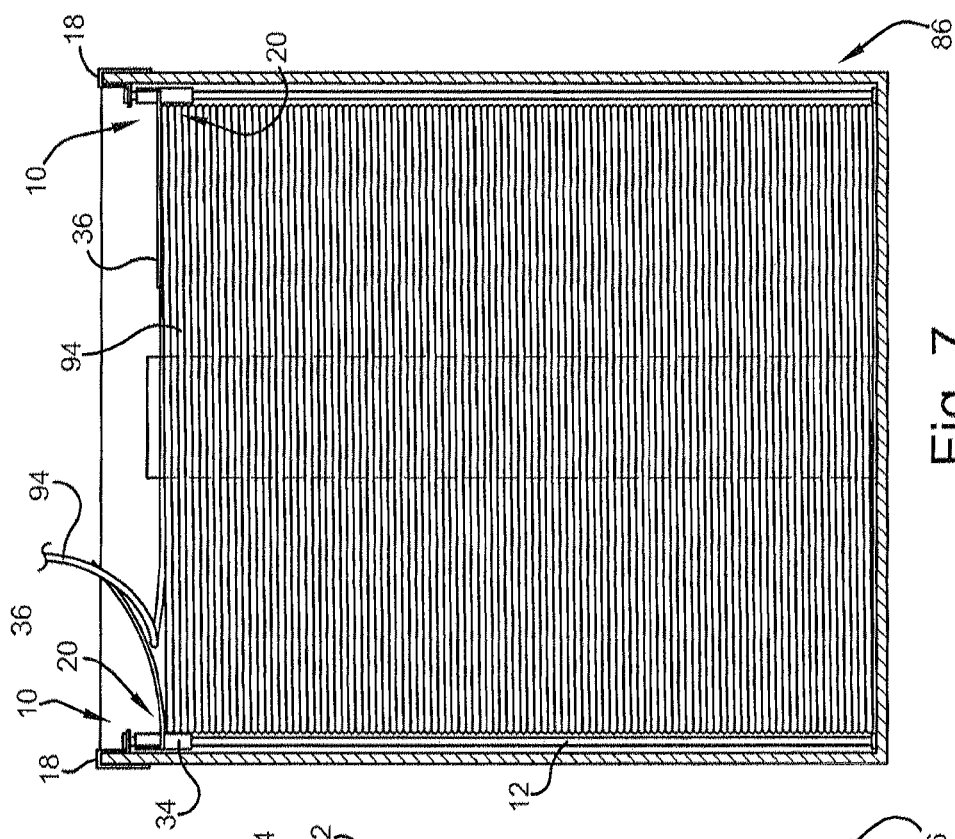
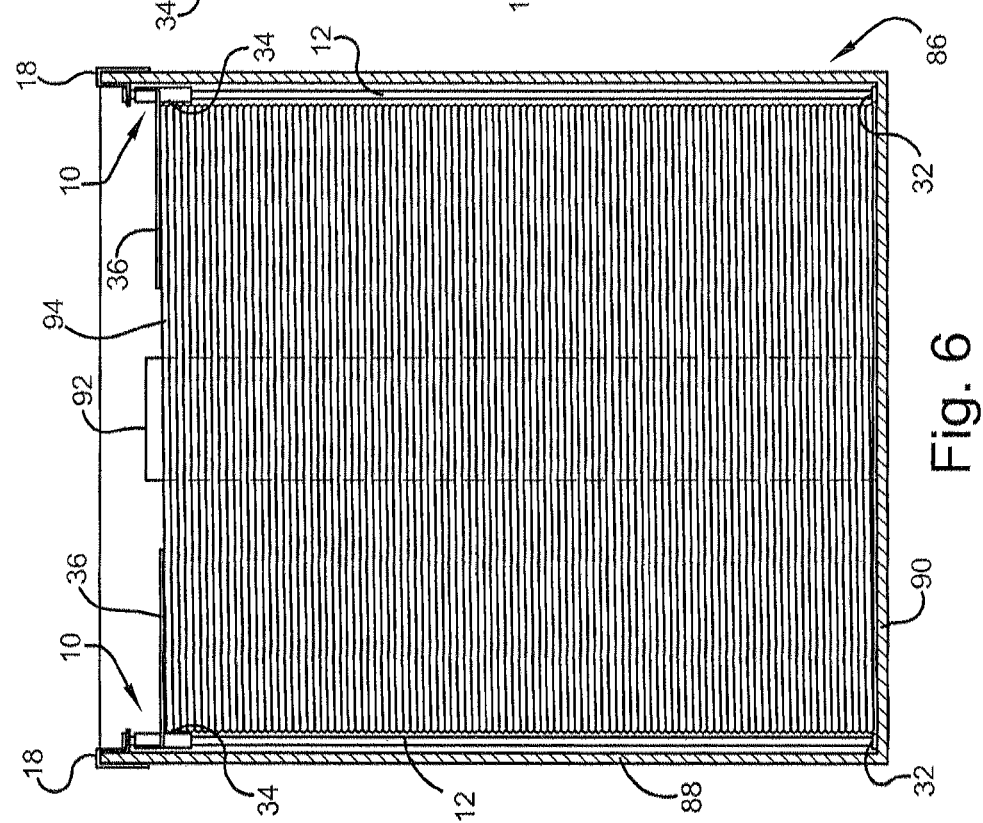

US 8,381,906 B2

BULK WIRE DAMPENING APPARATUS AND METHOD

TECHNICAL FIELD

The invention described herein relates generally to dampening devices for bulk welding wire containers and a method of using the same.

BACKGROUND OF THE DISCLOSURE

Welding applications which require large quantities of welding wire necessitate welding wire packages which contain large quantities of a continuous welding wire. As a result, large welding wire packages have been created for these applications which allow for a significant amount of welding run time before the operation must be shut down to restring a new package of welding wire. This is particularly important for automated or semi-automated welding operations.

Bulk packaging of welding wire is gaining popularity in both automated and semi-automated welding applications due to the reduced down time necessary to change and restring a new package of welding wire. Further, it is important to have reliable wire payout or dispensing from the welding wire package without wire tangling or wire flip/wander. Each tangle can potentially shut down an entire manufacturing line and reduces production yield. In this respect, in order to work in connection with the wire feeder of the welder, the welding wire must be dispensed in a non-twisted, non-distorted and non-canted condition which produces a more uniform weld without human attention.

Drum or box wire packages have been developed which protect the welding wire from the manufacturing environment and which can be disposed of at a lesser cost. The welding wire is coiled into the drum or box package in a loosely wound wire stack or coil consisting of many convolutions of wire which are often not as structurally stable as the wire convolutions of other wire packages, a reeled wire for example. As a result, it is important to control the wire within the package in addition to the payout of the wire from the package in order to reduce twisting, tangling or canting of the welding wire. This condition is worsened with larger welding wire packages which are preferred in automated or semi-automated welding operations. Furthermore, abuse during shipping and handling of the soft drum or box container often disrupts the uniform spacing or stacking of each convolution in the wire stack, increasing tangling potential.

In view of the foregoing problems and shortcomings of removal or payout of welding wire from bulk welding wire containers, the present application describes bulk wire dampers to overcome these shortcomings.

SUMMARY OF THE DISCLOSURE

In accordance with the present invention, there is provided, in combination, a bulk wire dampening apparatus and bulk wire container. The combination includes a rod and a non-rotatable damper assembly. The rod has a first end for engagement with a top of the container and a second end for contacting engagement with a bottom of the container. The non-rotatable damper assembly includes a vertically slidable sleeve for movement on the rod and a damper, where the damper laterally extends from a portion of the sleeve and extends over an uppermost portion of the bulk wire container.

Also within the scope of the invention is an assembly that includes a bulk wire container and at least one damper apparatus configured to provide a downward dampening force on an uppermost portion of the bulk wire. The container includes at least one sidewall and is configured to hold a bulk wire. The at least one damper includes a rod supported by the bulk wire container and the damper assembly includes a sleeve and a damper. The damper laterally extends from a portion of the sleeve and extends over at least a portion of the bulk wire container. The assembly also includes a means for preventing the damper assembly from rotating relative to the rod.

Also within the scope of the invention is another combination of a bulk wire dampening apparatus and bulk wire container that includes a rod and a non-rotatable damper assembly that includes a damper made from non-resilient material. The rod includes a first end for engagement with a top of the container and a second end for contacting engagement with a bottom of the container. The non-rotatable damper assembly includes a vertically slidable sleeve and the damper laterally extends from a portion of the sleeve.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 3 is a perspective view of an alternative rod and damper assembly;

FIG. 4 is a side elevational view of an upper portion of an alternative dampening apparatus;

FIG. 5 is a side elevational view of an upper portion of another alternative dampening apparatus;

FIG. 6 is a side elevational view in partial cross-section of a bulk wire container having dampening apparatuses, each laterally extending damper positioned traverse to the longitudinal axis of the dampening apparatus;

FIG. 7 is a view similar to FIG. 6 where welding wire is being withdrawn from one side of the container, illustrating one laterally extending damper being deflected in an upward direction;

DETAILED DESCRIPTION OF THE DRAWINGS

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

Figures 1, 2:
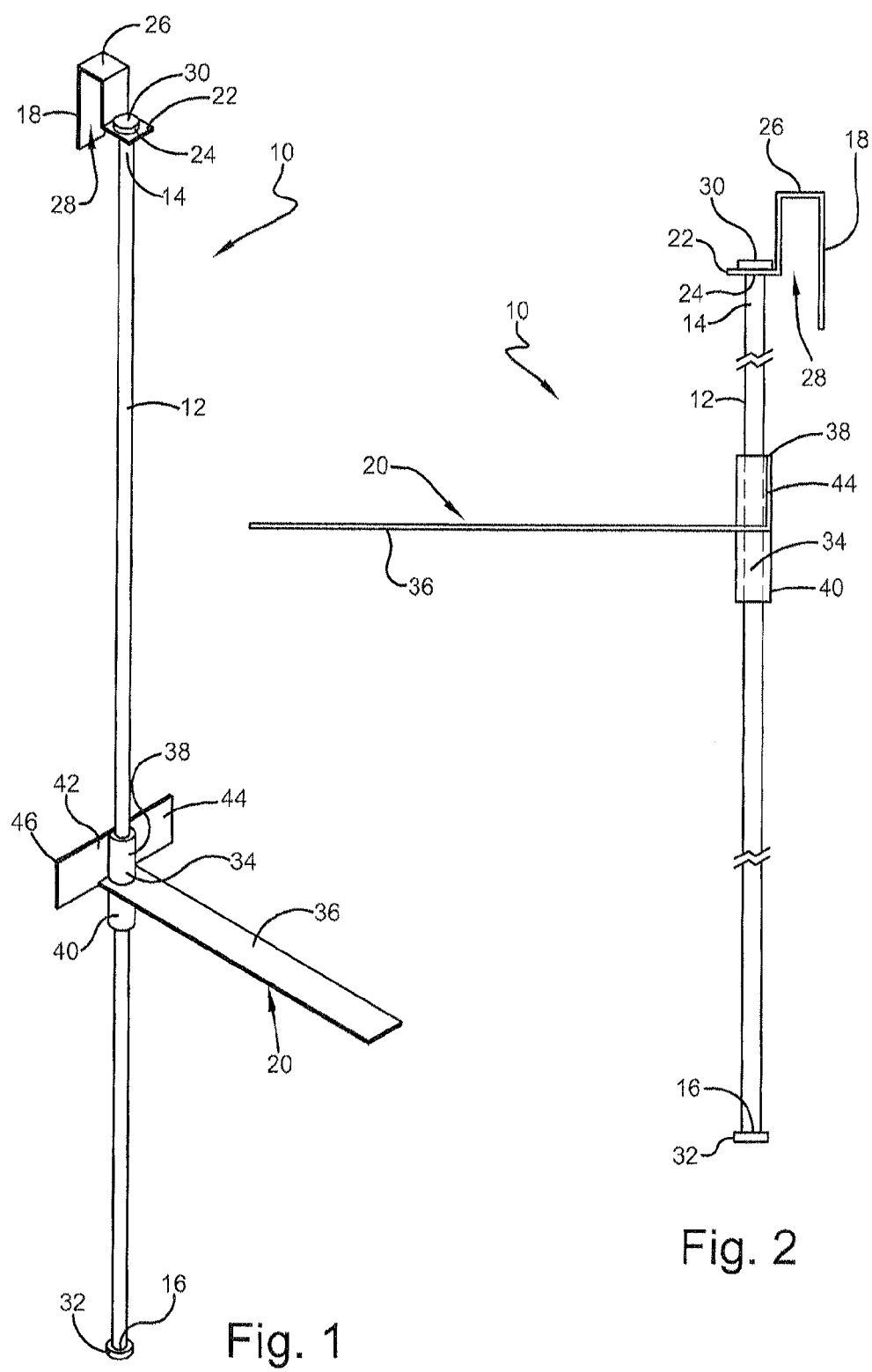
FIG. 1 is a perspective view of a dampening apparatus.
FIG. 2 is a side elevational view of the dampening apparatus illustrated in FIG. 1.
Figures 10, 11:
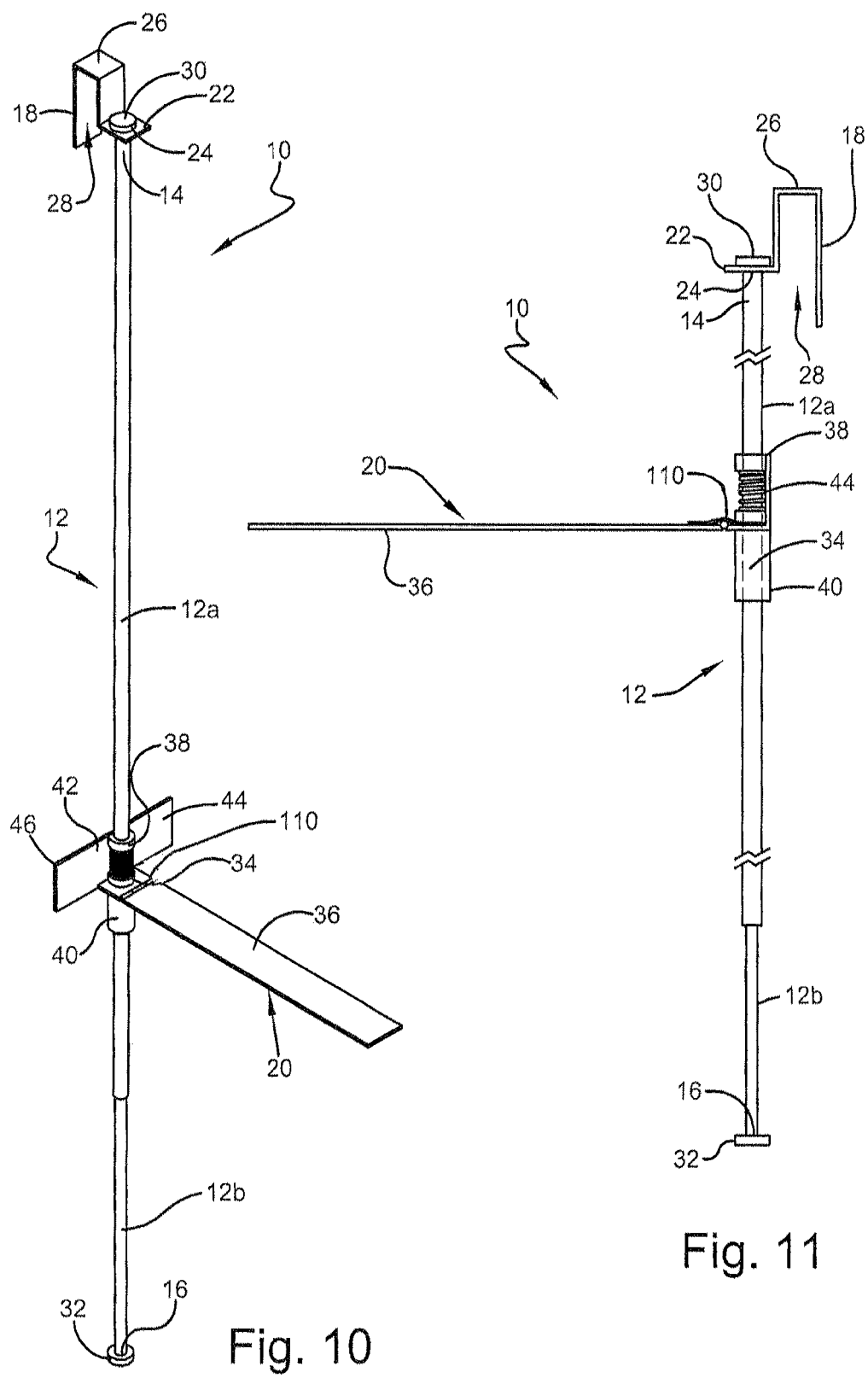
FIG. 10 is a perspective view of a dampening apparatus similar to FIG. 1 illustrating a hinged and spring-biased dampener as well as a telescoping rod.
FIG. 11 is a side elevational view of the dampening apparatus illustrated in FIG. 10.

Referring now to the drawings wherein the showings are for purposes of illustrating the preferred embodiment of the invention only and not for purposes of limiting the same, as illustrated in FIG. 1, dampening apparatus 10 includes cylindrical rod 12 having first end 14, second end 16, bracket 18, and damper assembly 20. In another embodiment (not shown), the rod has a non-cylindrical cross-section, including at least one of the following non-exhaustive and non-limiting list of cross sections or portions thereof: square, rectangle, ellipse, trapezoid, parallelogram, and n-sided polygon. In the illustrated embodiment, rod 12 is vertically extending along a longitudinal axis and has a length configured so dampening apparatus 10 fits within a specified bulk wire container (discussed below). In another embodiment (illustrated in FIGS. 10-11), rod 12 is a telescoping rod or tube (12*a*, 12*b*), allowing the rod to fit within more than one specified bulk wire container. For example, the telescoping rod may have an adjustable height that is equal to a height of at least one container. In yet another embodiment (not shown), the rod is threaded, includes threaded portions, or includes at least one threaded end (as discussed below). In another embodiment (not shown), the rod is hollow and includes a downward force producing member that may be attached to at least one portion of the dampening apparatus.

In the illustrated embodiment, rod 12 is made from steel. In another embodiment (not shown), the rod is made from material to support ascending and descending damper assembly, a non-exhaustive and non-limiting list includes metal, wood, and plastic materials. Rods made from metal may be made from a non-exhaustive and non-limiting list that includes: carbon steel, stainless steel, aluminum, and copper; rods made from wood may be made from hardwoods and softwoods, including a non-exhaustive and non-limiting list that includes oak, pine, ash, cedar, buckeye, cherry, hickory, and maple, and; rods made from plastic may be made from a non-exhaustive and non-limiting list that includes thermoset resins, thermoplastic resins, and reinforced resins of either type. Rods made from thermoplastics may be made from a non-exhaustive and non-limiting list that includes acrylic, celluloid, ethylene-vinyl acetate, flouroplastics, polyacrylates, polyamide, polybutylene, polycaprolactone, polycarbonate, polyethylene, polypropylene, and polyvinyl chloride. Rods made from thermosets may be made from a non-exhaustive and non-limiting list that includes vulcanized rubber, melamine resin, polyimides, and polyester fiberglass as well as cross linked thermoplastics.

Figure 8:
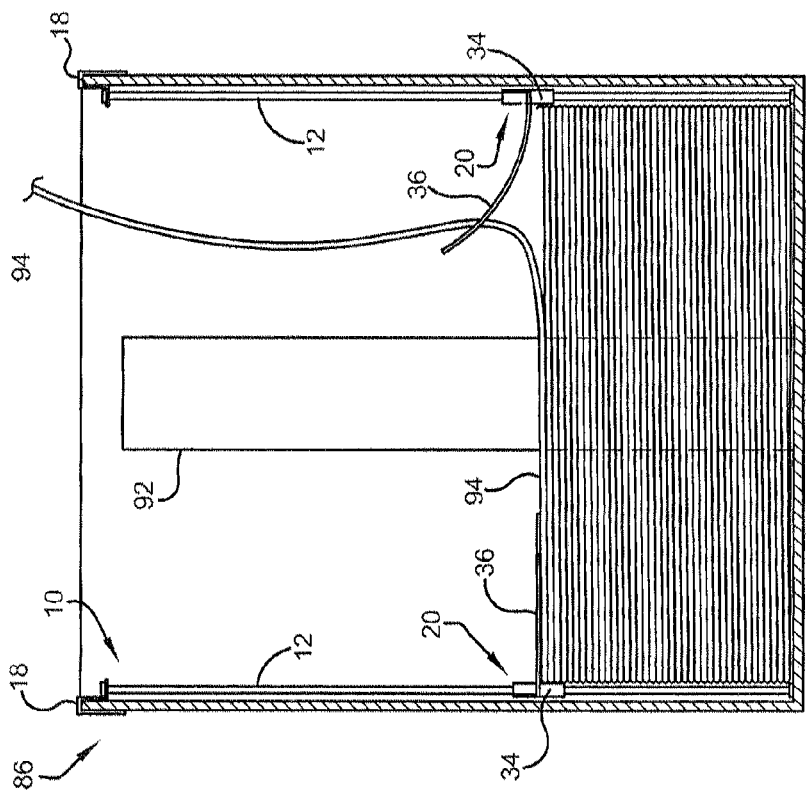
FIG. 8 is a view similar to FIGS. 6-7 where essentially half of the welding wire has been removed from the container.

In the illustrated embodiment, generally u-shaped bracket 18 includes a laterally extending portion 22 having an opening 24 and an inverted u-shaped portion 26 forming a downward facing opening 28 that is configured to slideably engage a sidewall or a portion of a bulk wire container (as better illustrated in FIGS. 6-8). For example, the width of downward facing opening 28 preferably forms an interference fit with the sidewall of a bulk wire container when u-shaped bracket 18 slides over the sidewall of the bulk wire container. In another embodiment (not shown), the bracket includes at least one fastener that securely connects the bracket to the sidewall of the bulk wire container. In yet another embodiment (not shown), the bracket includes inward facing projections that securely connect to portions of the sidewall as the bracket slides over the sidewall. In another embodiment (not shown), the bracket may have another shape, including but not limited to a circle, and/or the bracket may connect to an adapter that securely connects the bracket to the sidewall of the bulk wire container.

In the illustrated embodiment, laterally extending portion 22 of bracket 18 controls the offset of rod 12, preventing interference between the dampening apparatus 10 and the welding wire and/or the container. In another embodiment (not shown), laterally extending portion may be replaced with an adjustable portion or fastener so that the offset may be adjustable, allowing the bracket to be used with more than one specified bulk wire container or with more than one type of bulk wire.

In the illustrated embodiment, opening 24 of bracket 18 is configured to receive first end 14 of rod 12. Bracket 18 may secure to first end 14 of rod 12 by placing first end 14 of rod 12 through opening 24 and securing fastener 30 onto first end 14, e.g., a push nut, a rivet, and the like. In another embodiment (not shown), the rod includes threaded ends and at least one of the following securely connects the bracket to the first end: a nut, washer, lock washer, and lock nut. In yet another embodiment (not shown), the first end of the rod includes a laterally extending hole that is configured to receive a cotter pin that fastens the first end of the rod to the bracket. In another embodiment (not shown), the first end of the rod is welded to the bracket. In yet another embodiment (not shown), securing fastener is integrally formed in the rod.

In the illustrated embodiment, bracket 18 is made from steel. In yet another embodiment (not shown), the bracket is made from material to connect the rod of the dampening apparatus to the bulk wire container, a non-exhaustive and non-limiting list includes metal and plastic materials. A bracket made from metal may be made from a non-exhaustive and non-limiting list that includes carbon steel, stainless steel, aluminum, and copper, and a bracket made from plastic may be made from a non-exhaustive and non-limiting list that includes thermoset resins, thermoplastic resins, and reinforced resins of either type. Brackets made from thermoplastics may be made from a non-exhaustive and non-limiting list that includes acrylic, celluloid, ethylene-vinyl acetate, flouroplastics, polyacrylates, polyamide, polybutylene, polycaprolactone, polycarbonate, polyethylene, polypropylene, and polyvinyl chloride. Brackets made from thermosets may be made from a non-exhaustive and non-limiting list that includes vulcanized rubber, melamine resin, polyimides, and polyester fiberglass.

In the illustrated embodiment, rod 12 includes second end 16 having a foot or pad 32 that rests on a bottom of the bulk wire container. In another embodiment (not shown), the rod does not have a foot or pad, but rather just includes the second end.

In the illustrated embodiment of FIGS. 1-2, damper assembly 20 includes cylindrical sleeve 34 having laterally extending damper 36, where sleeve 34 includes upward extending portion 38 and downward extending portion 40. In another embodiment (not shown), the sleeve may only include upward extending portion or downward extending portion or the sleeve portions may extend to a greater or lesser extent than what is illustrated in FIGS. 1-2.

In the illustrated embodiments, sleeve 34 is made of plastic, including thermoset resins, thermoplastic resins, and reinforced resins of either type. Sleeve 34 is configured and made from material so that sleeve 34 slideably engages rod 12 of the dampening apparatus 10. For example, cylindrical sleeve 34 may slideably engage cylindrical rod 12 when sleeve 34 has an inside diameter that is greater than an outside diameter of rod 12. In another embodiment (not shown), the sleeve is made from plastic, wood, and/or metal materials, including the non-exhaustive and non-limiting list of bracket materials discussed above. In yet another embodiment (discussed below), the sleeve has a non-cylindrical configuration that slideably engages a non-cylindrical rod, as better illustrated in FIG. 3.

In the illustrated embodiment, gravity causes sleeve 34 and damper assembly 20 to slide down rod 12 when it is not supported by bulk wire as the level of the bulk wire decreases. In another embodiment (not shown), the sleeve may be connected to a spring loaded apparatus, elastic band, or other means which generates a downward force that causes the sleeve and the damper assembly to slide down the rod.

In the illustrated embodiments, damper assembly 20 also includes retainer 42 that is tangentially affixed to sleeve 34. Retainer 42 has a planar, rectangular shape that includes a first portion 44 and a second portion 46 that each extend laterally outward from sleeve 34. In another embodiment (not shown), the retainer may only include first portion or second portion, may include more or less than two portions, or the first portion and the second portion may have lengths that are greater than or less than what is illustrated in FIGS. 1-2. In yet another embodiment (not shown), retainer may have another shape or a portion thereof, including the non-exhaustive and non-limiting list that includes a square, rectangle, ellipse, circle, trapezoid, parallelogram, and polygon. In another embodiment (not shown), the retainer has a nonplanar or curvilinear form to align with a nonplanar container sidewall. In another embodiment (not shown), the damper assembly may not include the retainer, but the damper assembly may be prevented from rotating by at least one of the following: the rod and an anti-rotational apparatus.

In the illustrated embodiment, retainer 42 is made from a thermoplastic polycarbonate resin optionally including a filler for stiffening purposes. In another embodiment, the retainer is made from plastic and/or metal materials, including the non-exhaustive and non-limiting list of bracket materials discussed above.

In the illustrated embodiment, retainer 42 is configured to prevent damper assembly 20 from rotating on rod 12 when retainer 42 is placed adjacent to a sidewall of a bulk wire container. For example, retainer 42 may have a 1 inch height and a 3 inch length (linear or nonlinear) that aligns with the sidewall of the container. When welding wire loop or strand is pulling off from the bulk wire, damper assembly 20 tries to rotate but retainer 42 pushes against or abuts against a sidewall of the container, preventing the damper assembly from rotating on rod 12.

In the illustrated embodiment, damper 36 is preferably made from a thermoplastic polycarbonate resin optionally including a filler for stiffening purposes, formed in a rectangular, elongated shape. In another embodiment, the damper is made from plastic and/or metal materials, including the non-exhaustive and non-limiting list of bracket materials discussed above. In yet another embodiment (not shown), damper has a non-rectangular, elongated shape. In the illustrated embodiment, damper 36 has a thickness that maintains a straight shape when it is not acted on by an external force, and damper 36 is configured to bend or resiliently deform in a direction perpendicular to its length if acted on by an external force. A material that resiliently deforms is one that can elastically deform and then recover its original size and shape, different materials have different elastic deformation limits and, therefore, may resiliently deform to different limits. In another embodiment, the damper is made from material and has a thickness that maintains a substantially straight shape at all times, for example, when the damper is connected to a pivoting apparatus.

In the illustrated embodiment, damper 36 allows only a single loop of welding wire to advance out or payout of the bulk wire box and then the damper falls by gravity back onto an uppermost portion to dampen other welding wire loops. For example, if an end of the damper is pulled up by a single loop of welding wire pulling off from the bulk wire, damper 36 moves or flexes upward, moving damper assembly 20 slightly upward until the loop of bulk wire releases the damper. Once released, damper 36 will resiliently move or flex downward to its laterally extending position, and the damper assembly 20 will slide back down until it settles on an uppermost portion of the welding wire. In one embodiment, damper 36 is about 1 inch wide and about 5 inches long, extending beyond the inside diameter of the coiled bulk wire. In another embodiment (not shown), damper includes a pivoting portion that is configured to flex up to allow removal of one welding wire loop or strand. The pivoting portion may also be configured to flex down into position by gravity and/or by a downward forcing device when the welding wire removes from underneath the damper. In yet another embodiment (illustrated in FIGS. 10-11), the damper is made from rigid, non-resilient material and a spring loaded hinge 110 attaches the damper to the sleeve, wherein the spring loaded hinge returns the damper to a resting position when the welding wire removes from underneath the damper.

FIG. 2 illustrates a side view of dampening apparatus 10 illustrated in FIG. 1. Rod 12 is shown extending through sleeve 34 of damper assembly 20 and through opening 24 of bracket 18. Damper assembly 20 may slide between optional foot or pad 32 and bracket 18. For example, damper assembly 20 may slide up rod 12 if pulled on by, for example, a single loop of welding wire and may slide down rod 12 when released by the single loop of welding wire, sliding down by gravity as the level of the bulk welding wire decreases.

FIGS. 3-5 illustrate portions of alternative dampening apparatuses that are non-exhaustive and non-limiting examples. Illustrated in FIG. 3 is a portion of alternative dampening apparatus 50 that is substantially similar to dampening apparatus 10 illustrated in FIGS. 1-2, except dampening apparatus 50 includes an alternative rod and dampening assembly. Rectangular rod 52 slideably engages with rectangular sleeve 54, preventing damper assembly 56 from rotating on rod 52. Further, dampening apparatus 50 does not include a retainer because rectangular sleeve 54 does not rotate on rectangular rod 52. As discussed above, the rod and the sleeve can have other non-cylindrical cross-sections that prevent the damper assembly from rotating on the rod.

FIG. 4 illustrates another portion of an alternative dampening apparatus 60 that is substantially similar to the dampening apparatus 10 illustrated in FIG. 2, except dampening apparatus 60 does not include a bracket that fastens to rod 62. Instead, first end 64 of rod 62 is formed into a shape having a laterally extending portion 66 and a u-shaped portion 68 that forms a downward facing opening 70 that is configured to fit on a sidewall or a portion of a bulk wire container (as better illustrated in FIGS. 6-8). In another embodiment (not shown), the u-shaped portion may extend further down than what is illustrated in FIG. 4.

FIG. 5 illustrates yet another portion of an alternative dampening apparatus 72 that is substantially similar to the dampening apparatus 10 illustrated in FIG. 2, except dampening apparatus 72 includes adapter 74 and does not include a bracket that fastens to rod 76. Rod 76 includes first end 78 that forms a partial circle shape, similar to an umbrella handle, and adapter 74 includes a surface 80 configured to engageably hold first end 78 of rod 76. Further, adapter 74 includes an opening 82 configured to engageably hold a sidewall of a bulk wire container and a lateral portion 84 configured to control the offset of rod 76. As discussed above, the offset prevents interference between the dampening apparatus 72 and the welding wire and the container. In another embodiment (not shown), first end of the rod and the surface of the adapter can have another complementary shape, a square for example. In yet another embodiment (not shown), dampening apparatus may include fasteners, straps, and the like to engageably hold the first end and the surface of the adapter.

FIG. 6 illustrates a side elevational view in partial cross-section of a bulk wire container 86 having at least one laterally extending, planar side wall 88, bottom 90, center 92, welding wire 94, and two dampening apparatuses 10, discussed above. Each rod 12 fits between an exterior peripheral circumferential edge of welding wire 94 and sidewall 88 of bulk wire container 86. Each foot or pad 32 rests on bottom 90, and each bracket 18 secures to at least one sidewall 88, as discussed above. In another embodiment (not shown), each rod of the two dampening apparatuses fit between an interior peripheral circumferential edge of the welding wire and the center of the bulk wire container. In the illustrated embodiment, each damper 36 is shown resting on the uppermost portion of welding wire 94 and each sleeve 34 is shown elevated on each rod 12 towards upper portion of sidewall 88, at or above the uppermost level of the bulk welding wire. In another embodiment (not shown), bulk wire container includes more than two dampening apparatuses. In yet another embodiment (not shown), bulk wire container includes one dampening apparatus. In another embodiment (not shown), bulk wire container includes laterally extending, nonplanar sidewalls.

FIG. 7 illustrates a side elevational view in partial cross-section of a bulk wire container 86 and two dampening apparatuses 10, substantially similar to FIG. 6, except welding wire 94 is being removed from one side of container 86. In the illustrated embodiment, damper 36 on the left side of container 86 is flexing upward as welding wire 94 pulls upward onto an edge of damper 36, sliding sleeve 34 upward along rod 12. As discussed above, damper 36 may be configured to be rigid or damper assembly may include a pivoting assembly, therefore, damper 36 may not flex or curve upward as illustrated in FIG. 7. After welding wire 94 pulls past and above the edge of damper 36, damper assembly 20 slides down rod 12 by gravity and settles on an uppermost portion of welding wire 94. The damper 36 on the right of container 86 rests on an uppermost portion of welding wire 94 until an upward moving portion or a single loop of welding wire 94 provides enough upward force to overcome the dampening force provided by damper 36.

FIG. 8 illustrates another side elevational view in partial cross-section of a bulk wire container 86 and two dampening apparatuses 10, substantially similar to FIGS. 6-7, except welding wire 94 is being removed from another side of container 86 and essentially half of the welding wire 94 has been removed. In the illustrated embodiment, damper 36 on the right side of container 86 is flexing upward as welding wire 94 pulls upward onto an edge of damper 36, sliding sleeve 34 upward along rod 12. After welding wire 94 pulls past and above the edge of damper 36, damper assembly 20 slides down rod 12 by gravity and damper 36 settles on an uppermost portion of welding wire 94. The damper 36 on the left of container 86 rests on an uppermost portion of welding wire 94 until an upward moving portion or a single loop of welding wire 94 provides enough upward force to overcome the dampening force provided by damper 36. This repeats from one damper to the next, around the inside of the container, until removal of the welding wire stops.

Figure 9:
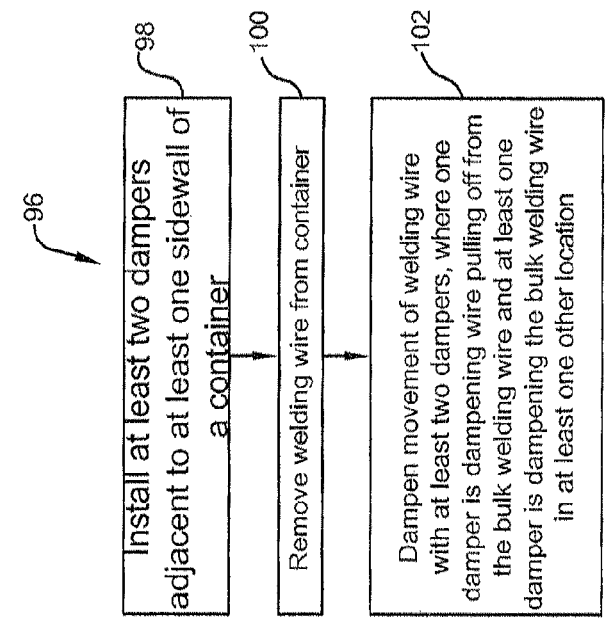
FIG. 9 is a flow chart illustrating one embodiment of a method of using a dampening apparatus.

FIG. 9 is a flow chart illustrating one embodiment of a method of using a dampening apparatus 96. As shown in FIG. 9, at least two dampers are installed adjacent to at least one sidewall of a container at 98. At 100, welding wire is removed from the container. The movement of the welding wire is dampened with at least two dampers at 102, wherein one damper dampens wire pulling off from one portion of the bulk welding wire and at least one damper is dampening the bulk welding wire in at least one other location.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. In combination, a bulk wire dampening apparatus and bulk wire container comprising:
   a rod having a first end for engagement with a top of said container and a second end for contacting engagement with a bottom of said container; and
   a non-rotatable damper assembly having a vertically slidable sleeve for movement on said rod and a damper, wherein the damper laterally extends from a portion of the sleeve and extends over an uppermost portion of the bulk wire container; and
   a bracket to receive the first end of the rod and a portion configured to attach to a sidewall of said bulk wire container.

2. The bulk wire dampening apparatus and bulk wire container of claim 1 further comprising:
   at least one retainer, wherein the at least one retainer tangentially attaches to the sleeve.

3. The bulk wire dampening apparatus and bulk wire container of claim 1 wherein,
   said bracket has an opening to receive the first end of the rod.

4. The bulk wire dampening apparatus and bulk wire container of claim 3 further comprising:
   a fastener, wherein the fastener securedly attaches the bracket to the rod.

5. The bulk wire dampening apparatus and bulk wire container of claim 3, wherein
   the portion of the bracket is further configured to have at least one of the following: inward facing projections and a fastening assembly.

6. The bulk wire dampening apparatus and bulk wire container of claim 1, wherein
   the damper resiliently deforms when acted on by an external force.

7. The bulk wire dampening apparatus and bulk wire container of claim 1 further comprising
   a hinge that connects the damper and the sleeve, wherein the hinge is a spring loaded hinge that provides a downward damping force.

8. The bulk wire dampening apparatus and bulk wire container of claim 1, wherein
   the rod is non-cylindrical in shape and the sleeve has a mating slot to receive the rod.

9. The bulk wire dampening apparatus and bulk wire container of claim 1, wherein
   the rod is a telescoping rod that has an adjustable height that is equal to a height of the bulk wire container.

10. The bulk wire dampening apparatus and bulk wire container of claim 1, wherein
    the rod is hollow and includes a downward biasing means that is attached to the sleeve of the damper assembly.

11. The bulk wire dampening apparatus and bulk wire container of claim 1 further comprising
at least a second dampening apparatus.

12. An assembly comprising:
a bulk wire container having at least one sidewall and configured to hold a bulk wire; and
at least one damper apparatus comprising:
  a rod supported by the bulk wire container, the rod having a first and an opposed second end, said first end having a laterally extending portion and a downward facing portion, wherein the downward facing portion is configured to slideably engage the at least one sidewall;
  a damper assembly having a sleeve and a damper, wherein the damper laterally extends from a portion of the sleeve and extends over at least a portion of the bulk wire container, and wherein the sleeve slideably engages the rod; and
  a damper assembly rotation preventing means,
  wherein the at least one damper apparatus is configured to provide a downward dampening force on an uppermost portion of the bulk wire.

13. The assembly of claim 12 further comprising
a retainer tangentially attached to the sleeve.

14. The assembly of claim 12, wherein
the rod and the sleeve have non-cylindrical cross-sections.

15. The assembly of claim 12 further comprising
an adapter having a surface and a lateral portion, wherein the rod includes a first end, wherein the surface of the adapter engageably holds the first end of the rod and the lateral portion provides an offset that prevents interference between the at least one damper apparatus and at least one of the following:
the bulk wire and the bulk wire container.

16. The assembly of claim 12, wherein
a first damper apparatus attaches to a first sidewall of the bulk wire container and a second damper apparatus attaches to a second sidewall of the bulk wire container.

17. The assembly of claim 12, wherein
the damper assembly further includes a spring loaded hinge that attaches the damper to the sleeve, wherein the spring loaded hinge forces the damper downward.

* * * * *

UNITED STATES PATENT AND TRADEMARK OFFICE
CERTIFICATE OF CORRECTION

PATENT NO. : 8,381,906 B2  Page 1 of 1
APPLICATION NO. : 13/113274
DATED : February 26, 2013
INVENTOR(S) : Mark Burke It is certified that error appears in the above-identified patent and that said Letters Patent is hereby corrected as shown below:

On the Title page, Item (73) Assignee: please delete "Linclon Global, Inc." and insert
--Lincoln Global, Inc.--.

Signed and Sealed this
Sixth Day of August, 2013

Teresa Stanek Rea
*Acting Director of the United States Patent and Trademark Office*